(12) United States Patent
Büschenfeld et al.

(10) Patent No.: US 6,261,049 B1
(45) Date of Patent: Jul. 17, 2001

(54) WITHDRAWAL DEVICE

(75) Inventors: Siegfried Büschenfeld; Wilfried Schürmann, both of Löhne (DE)

(73) Assignee: Horstman GmbH & Co. KG, Bad Oeynhausen (DE)

( * ) Notice: Subject to any disclaimer, the term of this patent is extended or adjusted under 35 U.S.C. 154(b) by 0 days.

(21) Appl. No.: 09/402,812

(22) PCT Filed: Feb. 18, 1998

(86) PCT No.: PCT/DE98/00480

§ 371 Date: Oct. 8, 1999

§ 102(e) Date: Oct. 8, 1999

(87) PCT Pub. No.: WO98/47834

PCT Pub. Date: Oct. 29, 1998

(30) Foreign Application Priority Data

Apr. 17, 1997 (DE) .......................................... 297 06 821 U
Jun. 9, 1997 (DE) .......................................... 297 09 975 U

(51) Int. Cl.$^7$ .................................................. B65G 25/00
(52) U.S. Cl. ..................................... 414/525.9; 198/750.6; 414/325
(58) Field of Search .................. 414/525.9, 325; 198/750.6

(56) References Cited

U.S. PATENT DOCUMENTS 5,544,739 * 8/1996 Christiaens et al. .......... 414/525.9 X

FOREIGN PATENT DOCUMENTS

| 93 08 069 U | 9/1993 | (DE) | ............................ C05F/17/02 |
| 0710636 A1 | 5/1993 | (EP) | ............................ C05F/17/02 |
| WO 93/17986 | 9/1993 | (WO) | ............................ C05F/17/02 |
| WO 94/26638 | 11/1994 | (WO) | ............................ B65G/25/06 |

* cited by examiner

Primary Examiner—Steven A. Bratlie
(74) Attorney, Agent, or Firm—Cohen, Pontani, Lieberman & Pavane

(57) ABSTRACT

A device for withdrawing debris, for example compost material, stored on a sliding base with longitudinally displaceable boards. A mobile driving unit having at least one driving device can be coupled/uncoupled to at least one section of the sliding base boards in at least one coupling position. The sliding base boards can be at least partially guided into and out of the driving unit. Once guided in, the ends of the sliding base boards remain in the driving unit during the longitudinal back and forth motion of the sliding base boards.

11 Claims, 8 Drawing Sheets

WITHDRAWAL DEVICE

BACKGROUND OF THE INVENTION

1. Field of the Invention

The invention relates to a withdrawal device for materials stored on sliding bases, in particular bulk materials such as materials to be composted.

2. Description of the Related Art

In known systems for storing bulk materials such as materials to be composted, it is known practice to store them, i.e. perform the composting process, on sliding bases arranged in tunnels, for example, and then to withdraw the composted material after composting, i.e. remove it from the tunnel.

It was known practice to store the material to be composted on a net-like base and, given an appropriate withdrawal, to roll up the entire net by means of a driving device to be arranged in front of the tunnel. That is to pull it out of the tunnel and hence also the compost material in the tunnel, and then to remove this material by means of conveyor belts.

It was also known practice to provide a driving unit being arranged in front of the individual tunnels such that it could likewise be moved and be capable of being coupled with the sliding bases.

A known driving device of this kind has sliding-base boards arranged in the movable part. These, boards are capable of being coupled to the sliding-base boards in the tunnel and each has their own drive arranged in the driving unit.

With such a device, there is the risk that material to be withdrawn will fall between the arranged boards and driven in the driving unit. The result is that this material will collect in the base area and will permanently impair the mobility of the driving unit and thereby increase the outlay on maintenance and cleaning.

SUMMARY OF THE INVENTION

It is therefore an object on which the invention is based to provide a withdrawal device for materials stored on sliding bases, particulary bulk materials such as materials to be composted: the device is, on the one hand, distinguished by a construction of simple design while, at the same time, being highly reliable in operation and which, furthermore, can be used with a very wide variety of sliding bases.

This and other objects are achieved in accordance with the present invention, wherein the driving unit has at least one driving device, which can be coupled to and decoupled from the sliding-base boards in at least one coupling position. The sliding-base boards are arranged in such a way that they can be moved at least partially into and out of the driving unit, at least with their end that faces the driving unit. The ends of the sliding-base boards which project into the driving unit after their insertion are arranged in such a way that, during a backward and forward motion of the sliding-base boards in the longitudinal direction, they do not leave the driving unit. This ensures, on the one hand, that various tunnels provided, for example, with sliding bases can be coupled into one and the same driving unit for the purpose of withdrawing the bulk material located in the tunnel or materials located on the sliding base, i.e. the individual sliding bases do not need a separate driving unit. It is also ensured that the material to be withdrawn is fed directly to the driving unit and hence to the conveyor belts provided. The speed of withdrawal and quantity withdrawn requiring appropriate control. It is furthermore ensured that the bulk material to be withdrawn does not get into the area of the path of the driving unit, i.e. does not impair the mobility of the driving unit. It is furthermore ensured that the door area of the individual tunnels remains unobstructed by the driving and/or coupling unit when not coupled, i.e. can, for example, be closed completely.

If a driving device which can be coupled to the sliding-base board is provided for each of the latter, this ensures that withdrawal can be performed in an optimum manner.

If the sliding-base board and the driving device are designed in such a way that they can be coupled at at least two coupling points arranged at a distance from one another, it is possible for that end of the sliding-base boards which faces the driving unit to be moved into the driving unit, thus ensuring that there is no gap between the driving unit and the end of the sliding base. A gap which would otherwise have to be bridged by auxiliary means; on the contrary, the driving unit and the sliding base form a unit.

If the sliding-base board has coupling devices which are used for coupling, this ensures direct coupling between the sliding-base board and the driving device and hence the driving unit without the need here for a manual operation such as the insertion of a pin, such pin creates a noncontinuous connection between the sliding-base board and the driving unit or withdrawal unit.

If the coupling device is a prismatic socket, this ensures that the coupling facility provided is not prone to faults and is thus reliable.

If the end of the sliding-base board is formed by a coupling piece and the coupling points are situated in the region of the coupling piece, this also allows retrofitting of existing sliding-base systems and replacement when wear occurs without the need to replace entire sliding-base boards.

If the driving device is a hydraulic cylinder which is designed to be controllable and has a piston rod designed as a push/pull rod, and if the piston rod is provided with a prism which is used for coupling, this ensures individual control of the individual sliding-base boards while maintaining a maximum of reliability and minimum susceptibility to faults.

If the driving unit has a surface for receiving and supporting the bulk material, and if a device for removing the bulk material from the driving unit is provided, this ensures that bulk material which passes into the driving unit can only leave it on the predetermined path (i.e. there is no risk that the bulk material will fall through available gaps into the area underneath the driving unit, even in small quantities).

If the device for removing the bulk material comprises two spade shafts, these having spades, and a screw shaft, this ensures that the compost which passes into the driving unit is loosened and homogenized before it is transferred to the conveyor belt.

If upon assuming a position within the driving unit, the end of each sliding-base board is arranged above the support, this ensures that the bulk material always reaches the support in the desired manner.

If at least two sliding bases, each arranged in a tunnel, are provided and at least one driving unit, which can be coupled optionally to at least some of the sliding bases present, is provided, this ensures that the driving unit is always optimally utilized and is hence utilized economically.

DETAILED DESCRIPTION OF THE PREFERRED EMBODIMENTS

Figure 1:
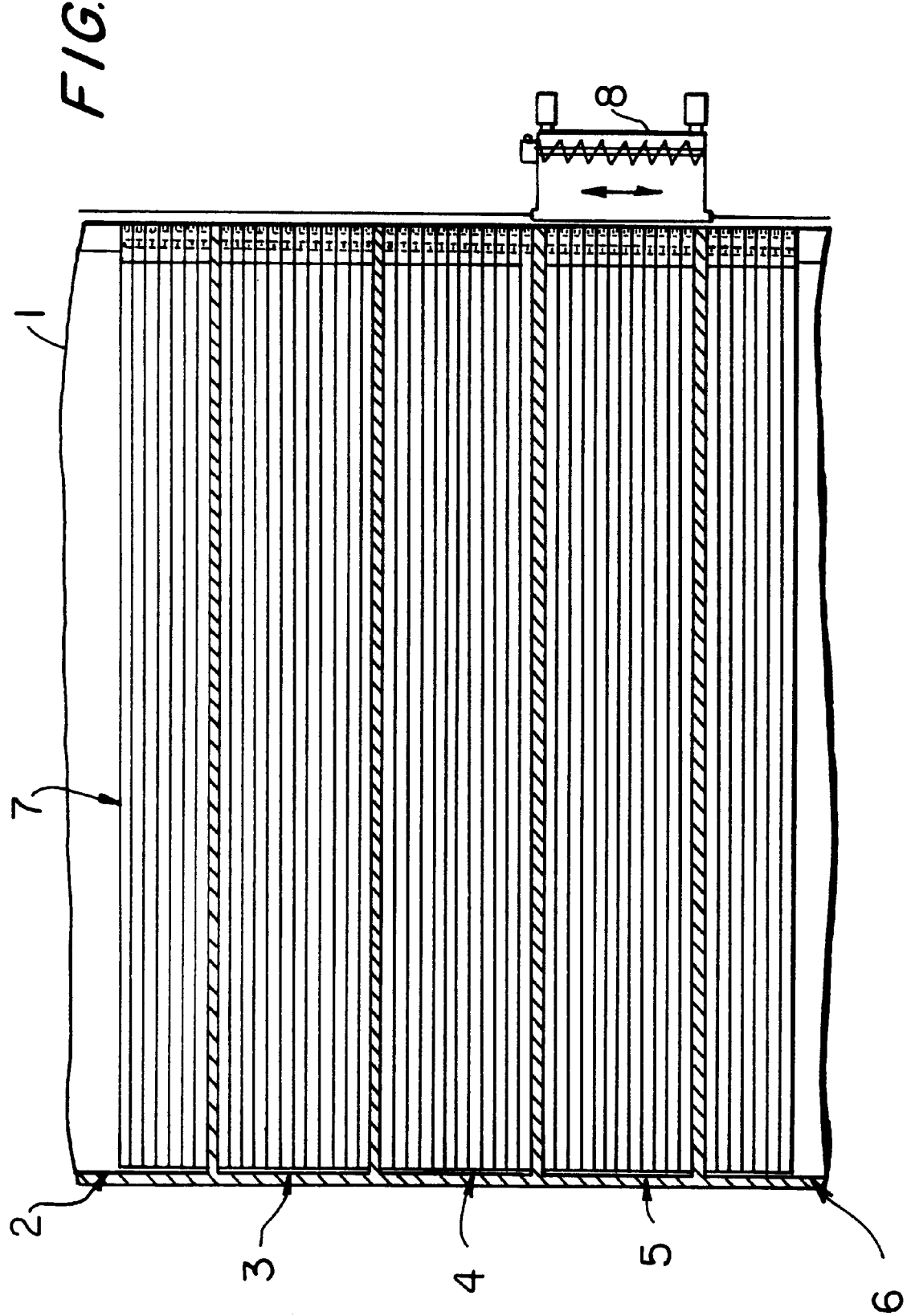
FIG. 1 shows a sectional partial plan view of tunnels which are arranged adjacent to one another and each have a sliding-base system, with a driving unit arranged in front of a tunnel.

As can be seen from FIG. 1, the composting system 1 represented in the embodiment example under consideration here has mutually adjacent tunnels 2, 3, 4, 5, 6, which are each provided with what is referred to as a sliding-base system, i.e. a sliding base 7 on which the waste to be composted or the bulk material to be composted is deposited.

Figure 9A:
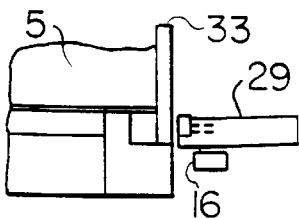
FIGS. 9a–9n show a schematic side view representation of various push/pull rod and cylinder positions.

The individual tunnels 2, 3, 4, 5, 6 are designed in such a way that they can be closed on their right-hand side as viewed in the direction according to FIG. 1, i.e. can each be closed by means of a gate 33 illustrated in FIG. 9a.

A driving unit 8 is furthermore arranged in front of the second tunnel 5 from the bottom when viewed in FIG. 1, this driving unit 8 being arranged in such a way that it can be moved, i.e. the driving unit 8 is guided by means of a guide system situated in front of the tunnels 2, 3, 4, 5, 6.

Figure 2:
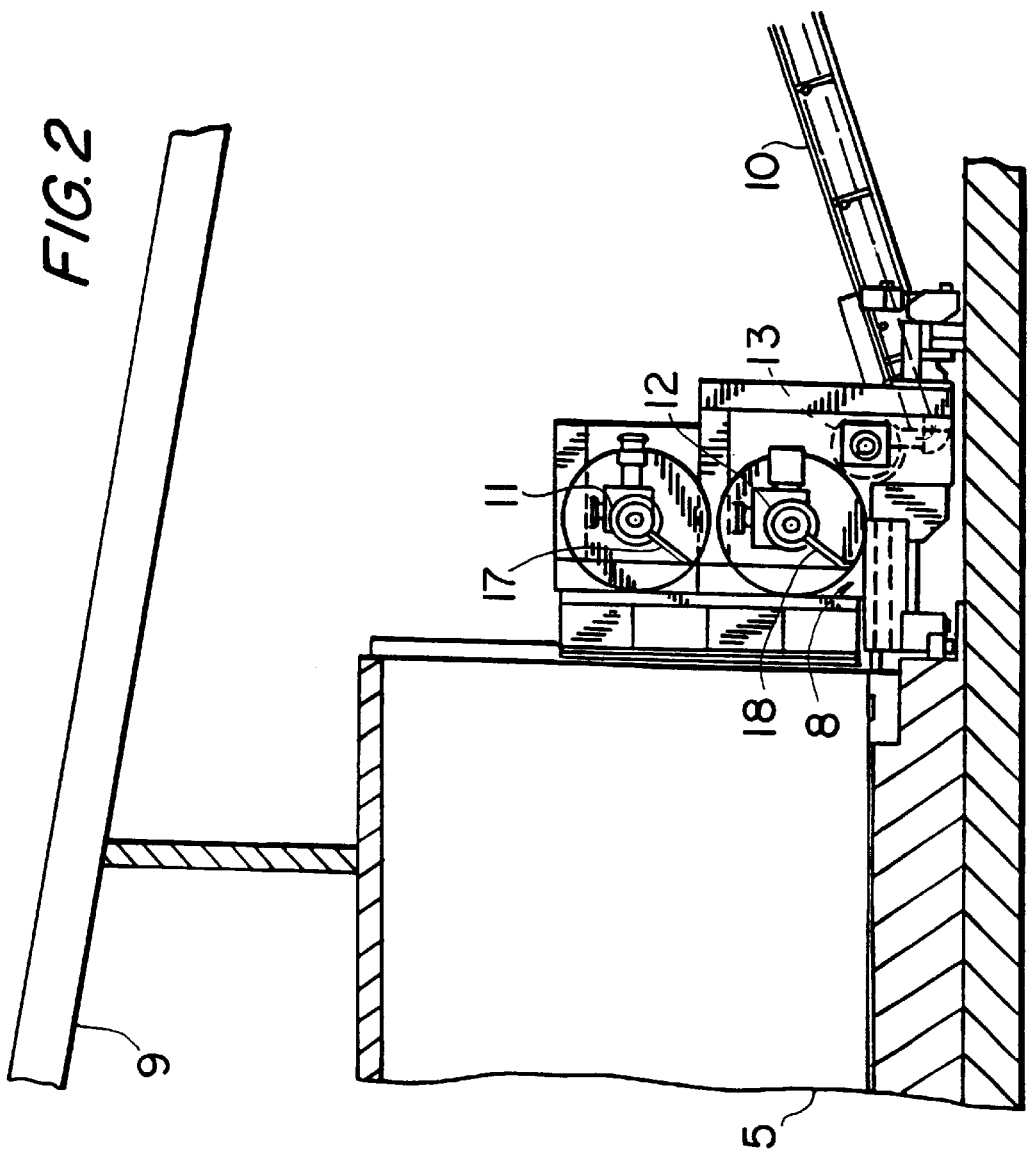
FIG. 2 shows a side view of the driving unit with an adjoining conveyor belt.

As can be seen from FIG. 2, in the case of the embodiment example under consideration here the entire composting system 1 is substantially accommodated in an enclosed shed 9.

As can furthermore be seen from FIG. 2, a rising conveyor belt 10 is assigned to the driving unit 8 in the exemplary embodiment. The compost to be withdrawn from the tunnel 5 is transported via the driving unit 8, with the spade shafts 11, 12, equipped with spades 17, 18, provided therein, to a screw shaft 13 likewise arranged in the driving unit 8. The material to be withdrawn is loosened and homogenized by means of the spade shafts 11, 12 fitted with spades 17, 18 and is then discharged onto the rising conveyor belt 10 by means of the screw shaft 13 and fed to further processing or onward transport and thus removal.

Figure 3:
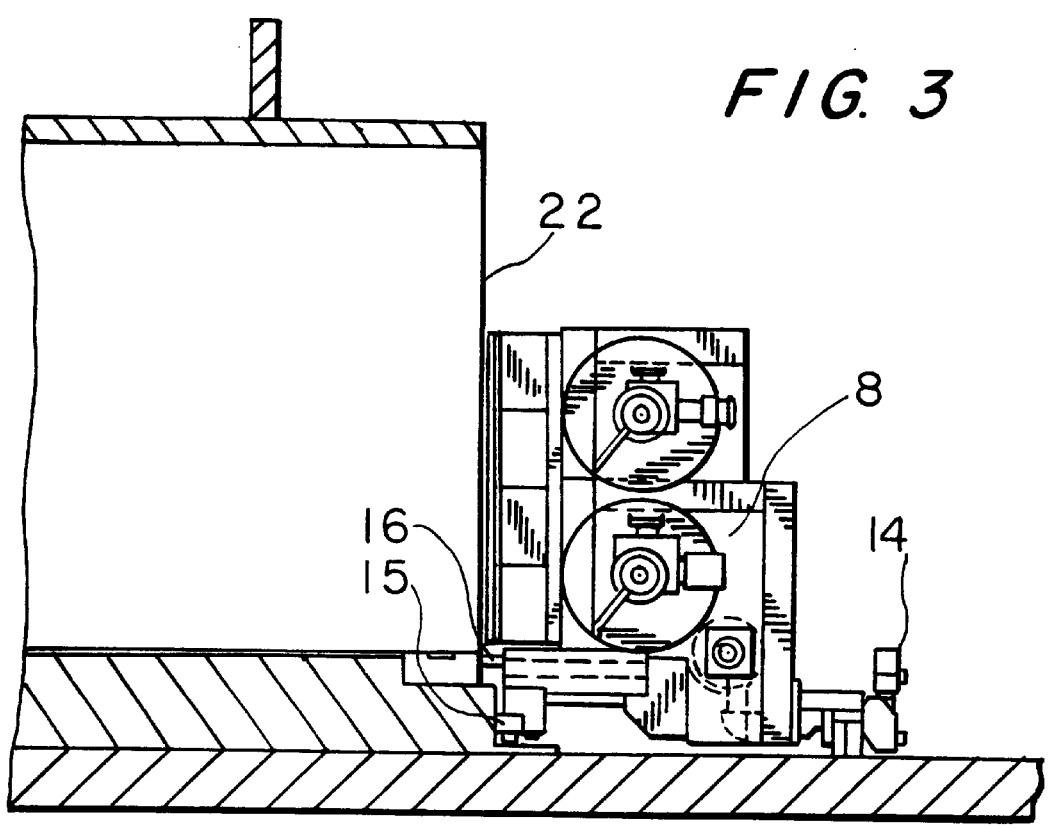
FIG. 3 shows a side view of the driving unit arranged in front of a tunnel with a sliding base.

As can be seen from FIG. 3, the driving unit 8 is arranged in front of the tunnel openings 22 in such a way that it can be moved by means of a drive 14, it being possible for the driving unit 8 to be supported both by vertical and horizontally arranged hydraulic cylinders 15, 16.

Figure 4:
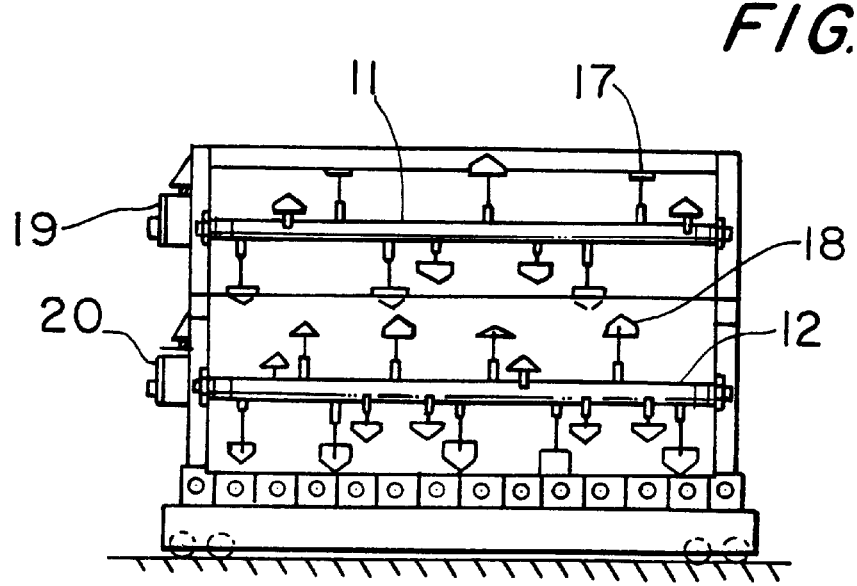
FIG. 4 shows a schematic front view of the driving unit with spade shafts.

FIG. 4, shows the spade shafts 11, 12 with the spades 17, 18 situated on them and with the respective drive 19, 20.

Figure 5:
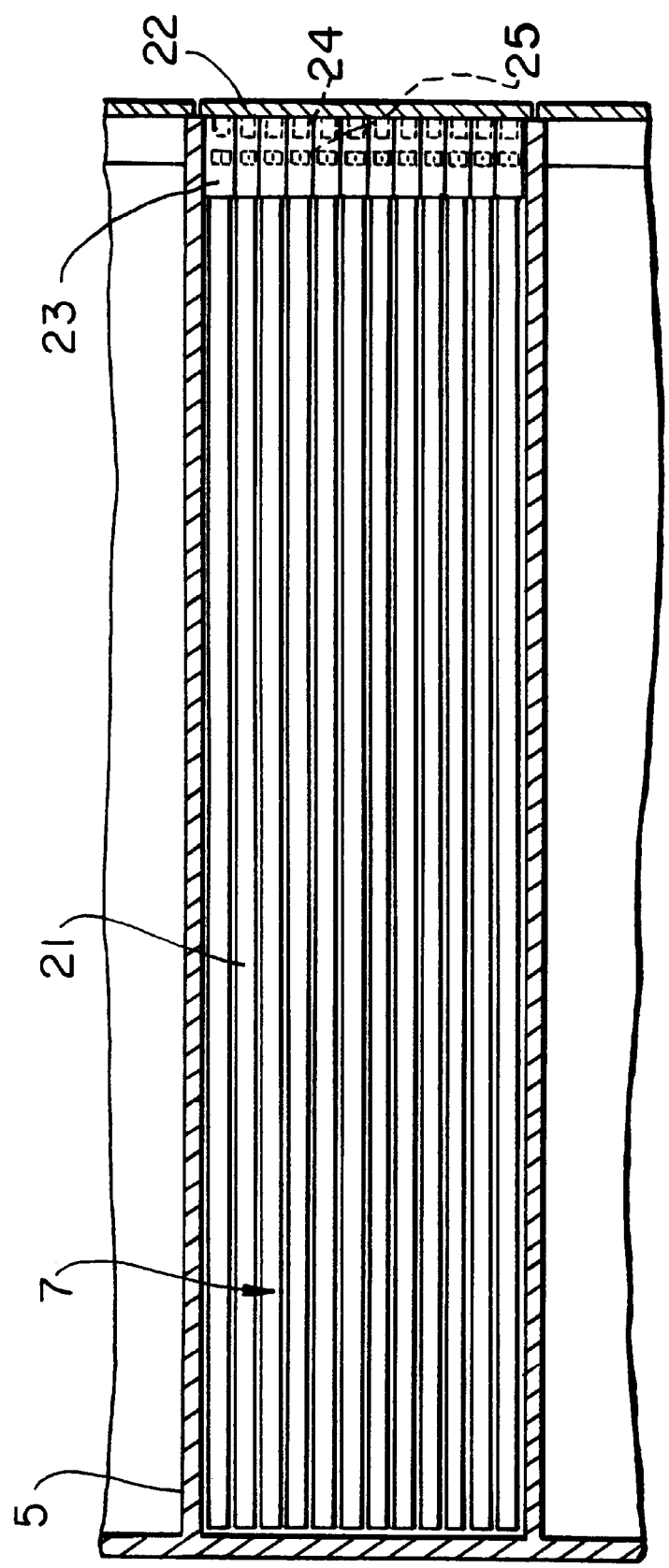
FIG. 5 shows a plan view of a tunnel with a sliding base.

FIG. 5 is a detail view of one of the tunnels 2, 3, 4, 5, 6 shown in FIG. 1, e.g. tunnel 5, with the sliding base 7 situated therein, which, in the exemplary embodiment, comprises sliding-base boards 21.

As can be seen from FIG. 5, the individual sliding-base boards 21 are arranged parallel to one another and spaced apart at their ends facing the closable opening 22 of the tunnel 5, they have coupling pieces 23 which are used to couple them to the respectively associated driving device including a hydraulic cylinder 30, a hydraulic piston 31, and a prism-shaped projection 32 (FIG. 8) arranged in the driving unit 8.

Figure 7:
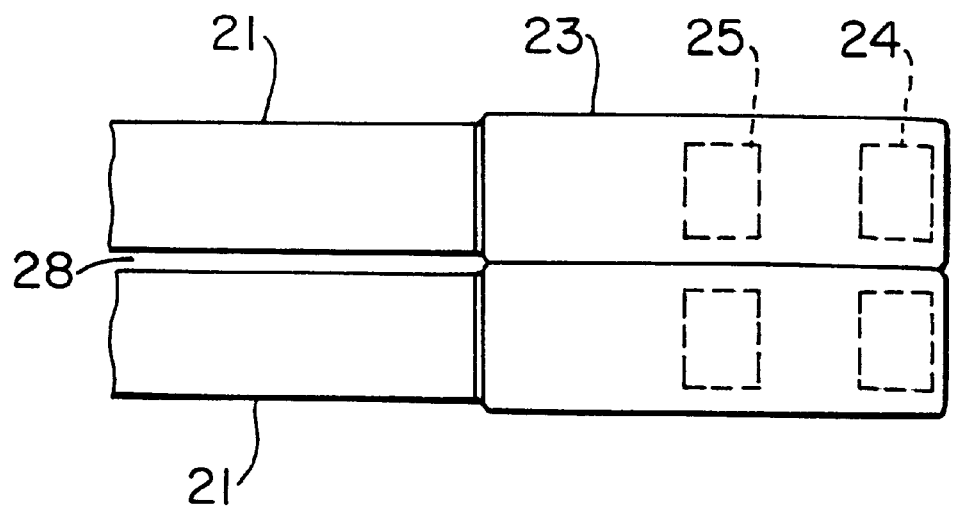
FIG. 7 shows a detail drawing of the front end of two sliding-base boards with respective coupling pieces.

For this purpose, as can be seen from FIGS. 5 and 7, each coupling piece 23 has two prismatic sockets 24, 25, i.e., dovetail-shaped sockets, arranged on a center line, i.e. coaxially at a distance from one another.

Figure 6:
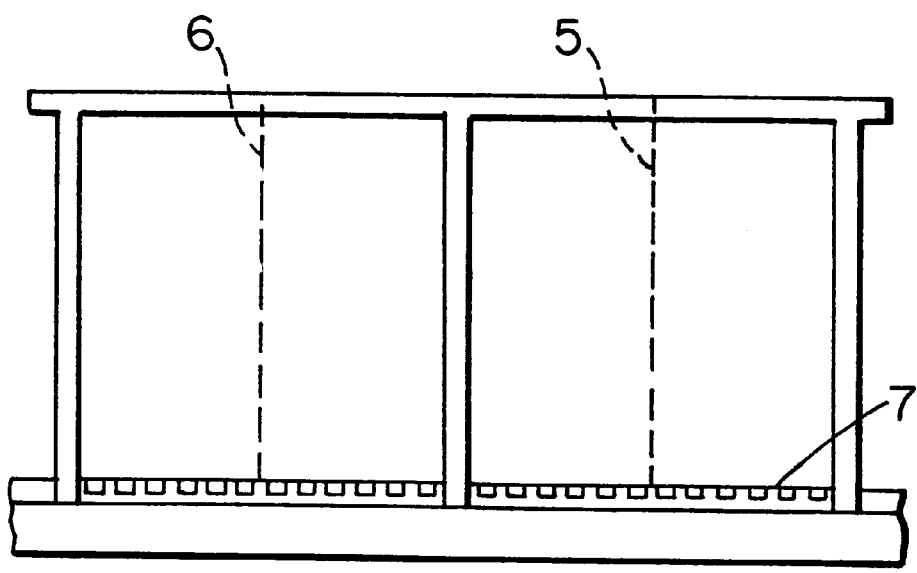
FIG. 6 shows a front view of two tunnels arranged adjacent to one another showing the sliding base.

As can be seen from FIG. 6, using one example of two adjacently arranged tunnels 5, 6, each tunnel 2, 3, 4, 5, 6 has the sliding base 7 illustrated in FIG. 5.

Figure 8:
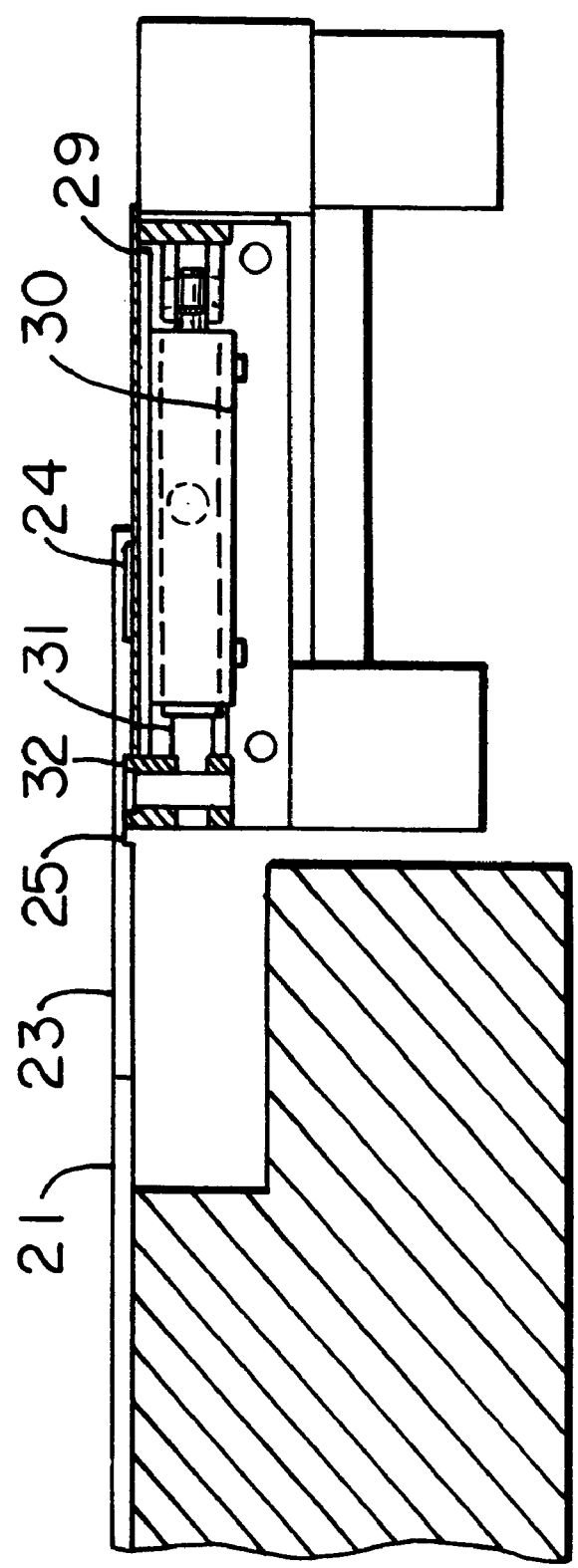
FIG. 8 shows a side view of a sliding-base board with a coupling piece when coupled to a push/pull rod of the driving device.

FIG. 8 shows driving unit 8 and a sliding-base board 21 coupled together.

The driving unit 8 has a bulk material support, i.e. a bulk material base 29, which is designed as a closed surface.

In the exemplary embodiment, this closed bulk material base 29 comprises individual segment boards which can be removed separately.

Under each of the segments of the bulk material base 29 there is a a hydraulic cylinder 30 of a driving device, which serves to drive the individual sliding-base boards 21, i.e. move them in the longitudinal direction.

In the exemplary embodiment, each sliding-base board 21 is assigned a, corresponding hydraulic cylinder 30 with a hydraulic piston 31, which, is designed as a push/pull rod. The number of hydraulic cylinders 30/hydraulic pistons 31 corresponds to the number of sliding-base boards 21 of the sliding base 7.

At the same time, it is conceivable that if the sliding bases 7 are of different sizes, the number of hydraulic cylinders 30/hydraulic pistons 31 could correspond to the number of sliding-base boards 21 of the largest sliding base 7.

As can be seen from FIG. 8 and already explained, the coupling piece 23 belonging to the sliding-base board 21 is situated at that end of each sliding-base board 21 which faces the driving unit 8.

In the exemplary embodiment, this coupling piece 23 has two prismatic sockets 24, 25 dovetail-shaped.

At the end of the hydraulic piston 31 there is a prism-shaped connector 32 i.e., dovetail-shaped, which is used to couple it to the respective sliding-base board 21.

In use, the driving unit 8 is first of all moved in front of the tunnel 2, 3, 4, 5, 6 to be emptied, in our embodiment example in front of tunnel 5, the intention being to remove the compost in tunnel 5 and deliver it to the conveyor belt 10.

Once the withdrawal device 8, 23 has been set up, the withdrawal process takes place fully automatically.

The driving unit 8 is moved in front of the center of the tunnel, i.e. accurately positioned, and all the hydraulic cylinders 30/hydraulic pistons 31 being arranged in the starting position, i.e. the retracted position, with the hydraulic piston 31 retracted during the traversing movement.

In the exemplary embodiment, as can be seen in FIG. 9a, the bulk material base 29 plus the hydraulic cylinder 30, the hydraulic piston 31 and the prism-shaped connector 32 are in an inclined position in the direction of the tunnel 5, the tunnel 5 being closed by the gate 33 illustrated here.

However, any other movement is also conceivable for the purpose of coupling.

Figure 9F:
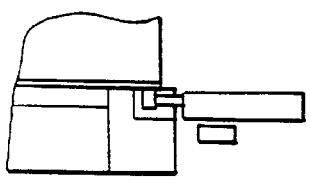
Figure 9K:
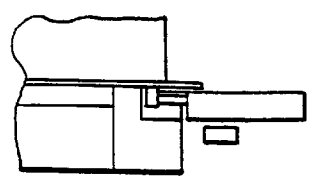
Figure 9B:
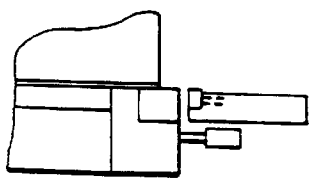

After appropriate positioning as described above, the gate 33 is first opened, after which the vertical support cylinders 15 of the driving unit 8 are extended, with the result that the bulk material base 29 is in a horizontal position illustrated in FIG. 9b.

The horizontal support cylinders 16 of the driving unit 8 are then extended and preloaded to operating pressure, thus ensuring that a precise starting position has been adopted.

Figure 9G:
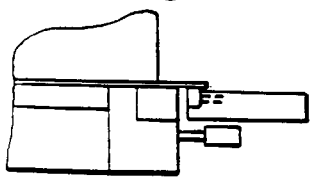
Figure 9L:
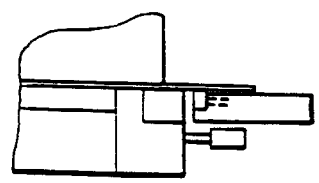
Figure 9C:
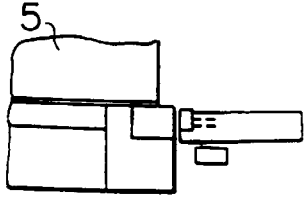
Figure 9H:
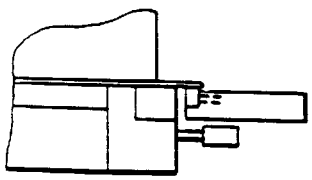
Figure 9M:
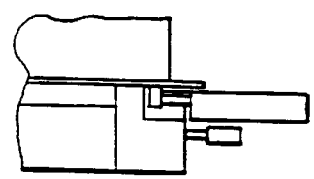
Figure 9D:
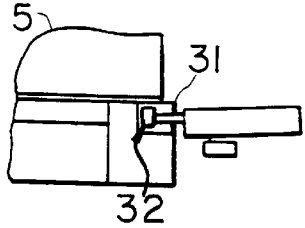

After appropriate precise positioning, the support cylinders 15, 16 are retracted, with the result that, as shown in FIG. 9c, the hydraulic cylinder 30 plus the hydraulic piston 31 and the bulk material support 29 are in a position in which they slope downwards in the direction of the tunnel 5.

The hydraulic piston 31 with prism-shaped connector 32 is then extended in such a way that the prism-shaped connector 32 is underneath the right-hand prismatic socket 24 illustrated in FIG. 8.

After appropriate positioning, the vertical support cylinders 15 are then extended as illustrated in FIG. 9F, with the result that the prism-shaped connector 32 comes into effective engagement with the prismatic socket 24.

The hydraulic piston 31 is now moved, as illustrated in FIG. 9g, into the rearward position illustrated in FIG. 8, with the result that all the sliding-base boards 21, each previously coupled in the manner described with a hydraulic piston 31, are displaced in the direction of the driving unit 8 (i.e. they project by a certain amount into the driving unit 8).

Before appropriate retraction of the hydraulic piston 31, the horizontal support cylinders 16, illustrated in FIG. 9g, are first extended.

Figure 9I:
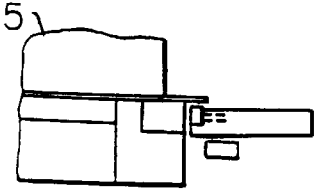
Figure 9N:
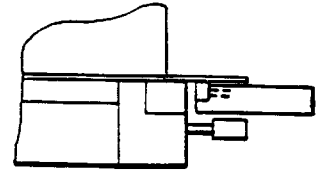
Figure 9E:
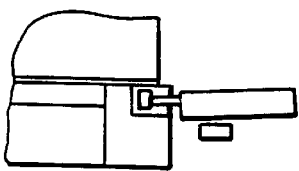

Both the horizontal and the vertical support cylinders 15, 16 illustrated in FIG. 9i, are now retracted, with the result that the driving unit 8, in particular the bulk material base 29 plus the hydraulic cylinder 30 and the hydraulic piston 31, move into a position in which they extend obliquely in the direction of tunnel 5.

Figure 9J:
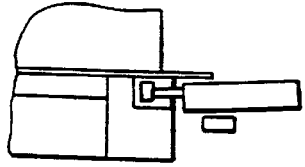
Figure 10A:
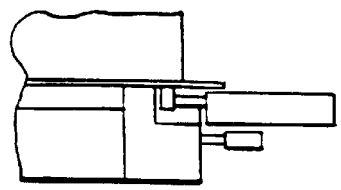
FIGS. 10a–10i show another schematic side view representation of various push/pull rod and cylinder positions.
Figure 10F:
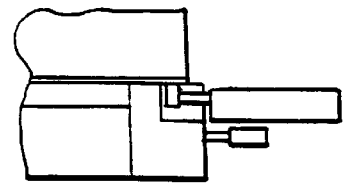
Figure 10B:
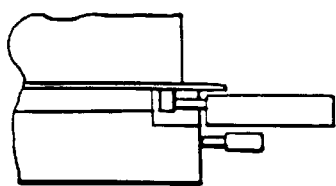
Figure 10G:
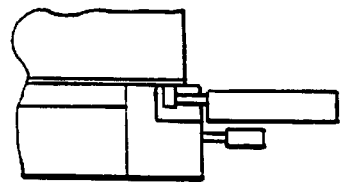
Figure 10C:
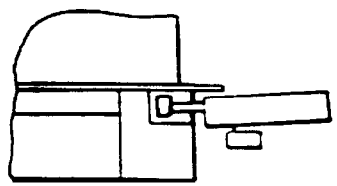
Figure 10H:
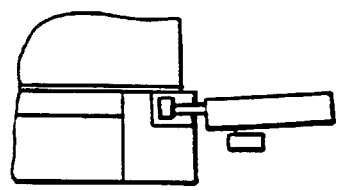
Figure 10D:
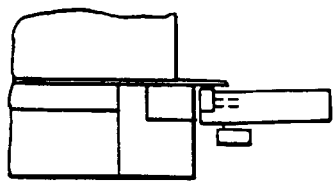
Figure 10I:
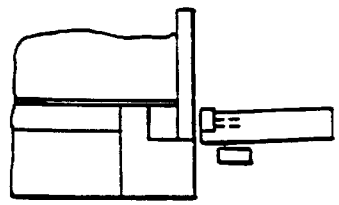
Figure 10E:
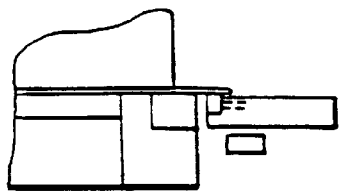

In accordance with FIG. 9j, the hydraulic piston 31 together with prism-shaped connector 32 and the vertical support cylinders 15 are extended again, with the result that the driving unit 8, i.e. in particular the hydraulic cylinder 30 together with the hydraulic piston 31 and prism-shaped connector 32, enter into effective engagement with the prismatic socket 25 illustrated in FIG. 8, which is on the left in the direction of view of FIG. 8. FIGS. 10a–10i show a schematic representation of the rod and cylinder positions in accordance with another embodiment of the present invention;

After effective engagement, the horizontally acting support cylinders 16 are then extended and the hydraulic piston 31 is moved into the position illustrated in FIG. 8.

Once this basic position has been adopted, the individual sliding-base boards 21 can go into operation by moving backwards and forwards (i.e. the compost introduced can be removed from the tunnel 5 in a known manner by appropriate movement of the sliding-base boards 21). The result of removal being that the material to be withdrawn passes via the sliding bases 21 and the associated coupling piece 23 onto the bulk material base 29 of the driving unit 8 and, from there, by means of the spade shafts 11, 12 which are present in the exemplary embodiment, have already been mentioned and have spades 17, 18, to the screw conveyor 13 and then onwards to the conveyor belt 10.

Three groups of cylinders, for example, are formed.

Once the withdrawal process is complete, the sliding base 7 must first be moved back into the starting position. For this purpose, the reverse procedure to that described above is adopted.

To unlatch the driving unit, all the sliding-board hydraulic cylinders 30 must be moved into the unlatching position.

The horizontal support cylinders 16 then retract first, followed by the vertical support cylinders 15, with the result that the entire unit 8 is lowered in the transition region and, in the process, settles on the guide system.

During the movement of the unit, all the cylinders 15, 16, 30 are retracted, with the result that the guide wheels on the guide rail bear the load and freedom of movement is ensured.

Attention is drawn to the fact that the arrangement of the sliding bases in the tunnel has been explained only by way of example, i.e. it is conceivable to arrange the sliding bases in any other structure, including arranging them in a truck, which would thus also affect the configuration and use of the withdrawal device.

What is claimed is:

1. A withdrawal device for materials stored on sliding bases, particularly bulk materials to be composted, each sliding base having sliding-base boards which can be moved at least partially in a longitudinal direction, the sliding-base boards having ends the withdrawal device comprising:

a mobile driving unit having at least one driving device capable of being selectively coupled and de-coupled from at least some of the sliding-base boards in at least one coupling position;

said driving unit being operatively arrangeable at said sliding-base boards so that the ends of the sliding-base boards face said driving unit, said driving unit being further operatively arranged for moving the ends of the sliding-base boards at least partially into and out of said driving unit, and wherein said ends of the sliding-base boards which project into said driving unit are adapted to stay within said driving unit during backward and forward motion of the sliding base boards for preventing the bulk materials from falling between the sliding-base boards and the driving unit when transferring the bulk materials from the sliding bases into the driving unit.

2. The device in accordance with claim 1, wherein said drive unit further comprises at least one driving device for each of the sliding-base boards of the sliding base.

3. The device in accordance with claim 2, further comprising at least two coupling points spaced from each other for providing a point of connection between the sliding-base board and said at least one driving device.

4. The device in accordance with claim 3, further comprising a coupling device comprising a socket disposed at each of said coupling points, said at least one driving device being couplable with the sliding-base boards via said coupling device.

5. The device in accordance with claim 3, wherein the ends of the sliding-base boards comprise a coupling piece, said coupling points being situated in a region of said coupling piece.

6. The device in accordance with claim 2, wherein said at least one driving device comprises a controllable hydraulic cylinder having a piston rod designed as a push/pull rod.

7. The device in accordance with claim 6, wherein said piston rod comprises a prism used for coupling.

8. The device in accordance with claim 1, wherein said at least one driving device comprises a surface for receiving and supporting the bulk material and said withdrawal device further comprises means for removing the bulk material from said surface of said at least one driving device.

9. The device in accordance with claim 8, wherein said means for removing comprises two spade shafts, at least one spade connected to each spade shaft, and a screw shaft for rotating said spade shafts.

10. The device in accordance with claim 8, wherein the end of each sliding-base board is positioned within said at least one driving unit above said support surface.

11. The device in accordance with claim 1, further comprising a tunnel in which at least two sliding-base boards are provided, said driving unit being selectively coupled to at least some of said at least two sliding-base boards.

* * * * *